(12) United States Patent
Crary, II et al.

(10) Patent No.: US 8,905,364 B2
(45) Date of Patent: Dec. 9, 2014

(54) SPACER FITTING REPAIR PLATE

(75) Inventors: Thomas U. Crary, II, Bismarck, ND (US); Jerome A. Peterson, Bismarck, ND (US)

(73) Assignee: MDU Resources Group, Inc., Bismarck, ND (US)

(*) Notice: Subject to any disclaimer, the term of this patent is extended or adjusted under 35 U.S.C. 154(b) by 421 days.

(21) Appl. No.: 13/102,723

(22) Filed: May 6, 2011

(65) Prior Publication Data

US 2012/0006953 A1 Jan. 12, 2012

Related U.S. Application Data

(60) Provisional application No. 61/332,434, filed on May 7, 2010.

(51) Int. Cl.
*F21V 21/00* (2006.01)
*H02G 7/05* (2006.01)

(52) U.S. Cl.
CPC ............. *H02G 7/053* (2013.01); *Y10S 248/903* (2013.01)
USPC ................... 248/218.4; 248/226.12; 248/300; 248/200; 248/903; 248/62

(58) Field of Classification Search
CPC ......... H02G 7/053; H01B 17/22; H01B 17/16
USPC ......... 248/218.4, 226.12, 300, 200, 201, 317, 248/58, 903, 62, 227.4; 174/45 R, 137 R, 174/158 R
See application file for complete search history.

(56) References Cited

U.S. PATENT DOCUMENTS

| | | | | | |
|---|---|---|---|---|---|
| 1,624,289 | A | * | 4/1927 | Taylor | 248/226.12 |
| 2,866,517 | A | * | 12/1958 | Phyl | 96/91 |
| 3,129,917 | A | * | 4/1964 | Huggins | 248/218.4 |
| 3,428,283 | A | * | 2/1969 | Dake | 248/214 |
| 4,291,194 | A | * | 9/1981 | Nigol et al. | 174/40 R |
| 4,798,362 | A | * | 1/1989 | Troutner | 248/62 |
| 6,779,762 | B2 | * | 8/2004 | Shibuya | 248/62 |
| 7,325,776 | B2 | * | 2/2008 | Shibuya | 248/62 |
| 8,173,904 | B1 | * | 5/2012 | Parduhn et al. | 174/137 R |

* cited by examiner

*Primary Examiner* — Anita M King
(74) *Attorney, Agent, or Firm* — Dorsey & Whitney LLP

(57) ABSTRACT

A reinforcement assembly for a spacer fitting for a utility pole comprising a front plate and back plate assembly having a connection aperture located at a top portion of both the front and back plates. The connection apertures may be configured to have substantially the same diameter as an insulator aperture located on the spacer fitting. The connection apertures provide an attachment area for the reinforcement assembly to be attached to the spacer fitting. The reinforcement assembly may be attached to the spacer fitting at an insulator aperture for supporting a strand of insulators and/or transmission lines. The front and back plates also may each include a receiving aperture located at a bottom portion of both plates. The receiving apertures may be used to support insulators and/or transmission wires on a transmission or utility support structure.

15 Claims, 12 Drawing Sheets

SPACER FITTING REPAIR PLATE

CROSS REFERENCE TO RELATED APPLICATIONS

This application claims the benefit of priority pursuant to 35 U.S.C. §119(e) of U.S. provisional application No. 61/332,434 filed 7 May 2010 entitled "Spacer Fitting Repair Plate," which is hereby incorporated herein by reference in its entirety.

BACKGROUND

I. Technical Field

The present invention relates generally to transmission line support structures and more particularly to brackets for transmission line support structures.

II. Background Discussion

A number of different types of wires extend across large areas through the use of transmission lines, for example power and telephone lines. In some instances these lines are held above ground by a series of support structures, such as H-frame poles, steel poles, single wood or steel lattice, etc. The wires may be connected directly to the support structure or connected indirectly, for example through insulators or other devices. In the case of electrical wires, the electrical wires are connected to insulators, which are then connected to the support structures. The insulators may be configured to swing or rotate, allowing the insulators and the wires to move with the wind and other factors. However, as the insulators may move, the connection location on the support structure that connects to the insulators may wear-out over time. For example, in some instances the insulators are connected to the support structures at a spacer fitting assembly. The spacer fitting assembly may include an aperture that receives a fastener, such as a hook, clevis or the like that connects the insulators to the support structure. As the insulators swing or otherwise move, the aperture in the spacer fitting may deform or "mushroom," pushing the material outwards, additionally the aperture may become elongated. Over time the aperture may eventually fail, causing the insulators and wires to fall to the ground, which could also potentially create a domino effect and cause other spacer fittings to fail also.

Replacing the connection location, i.e. the spacer fitting assembly, can be an expensive and complicated process. For instance, H-frame support structures may include two cross beams that are connected together by the spacer fitting assembly, and replacing the spacer fitting assembly requires the removal of bolts, which may be old and/or weathered. These bolts may be difficult to remove and replace, in fact some bolts may become stripped while they are removed. Also, the spacer fitting assembly often sets a distance between the two cross beams and this distance may vary between location points on each beam (i.e. the beam spacing changes width along their length) and may also vary between support structures. Typically, replacing the spacer fitting assembly also requires the distance between the cross beams to be kept essentially the same. This type of replacement may require significant time and labor expenses. Therefore, there is a need in the art for a quick and simple connection replacement and/or reinforcement for a spacer fitting assembly.

SUMMARY

Embodiments of the disclosure include a reinforcement assembly for a spacer fitting assembly comprising a front plate and a back plate. The front plate includes a front connection aperture located at a top portion of the front plate, wherein the front connection aperture is configured to be substantially the same diameter as an insulator aperture on the spacer fitting assembly. The front plate also includes a front receiving aperture located at a bottom portion of the front plate. The reinforcement assembly also includes a back plate comprising a back connection aperture located at a top portion of the back plate, wherein the back connection aperture is configured to be substantially the same diameter as the insulator aperture on the spacer fitting assembly. The back plate also comprises a back receiving aperture located at a bottom portion of the back plate. The front plate and the back plate may be configured to be installed on opposite sides of the spacer fitting assembly. Furthermore, the apertures on each the front and back plates may be aligned, such that if the front and back plate are placed against each other there is a passageway between the front receiving apertures on the front and back plates as well as a passageway between the back connection apertures on the front and back plates.

Other embodiments of the disclosure include a method of reinforcing a spacer fitting assembly for a utility support structure, comprising grinding flat the insulator connection aperture on a worn spacer fitting. Positioning a front plate comprising a front fastening aperture located on a top portion of the front plate and a front receiving aperture located on a bottom portion of the front plate on the spacer fitting, such that the front fastening aperture is substantially aligned with the insulator connection aperture. Positioning a back plate comprising a back fastening aperture located on a top portion of the back plate and a back receiving aperture located on a bottom portion of the front plate on the spacer fitting, such that the back fastening aperture is substantially lined up with the insulator connection aperture. Fastening the back plate, front plate, and spacer fitting assembly together via a fastener. Aligning the front receiving aperture, the back receiving aperture and the insulator connection aperture, creating a passageway between the front plate and the back plate.

BRIEF DESCRIPTION OF THE DRAWINGS

The use of the same reference numerals in different drawings indicates similar or identical items.

DETAILED DESCRIPTION OF THE INVENTION

Figure 1:
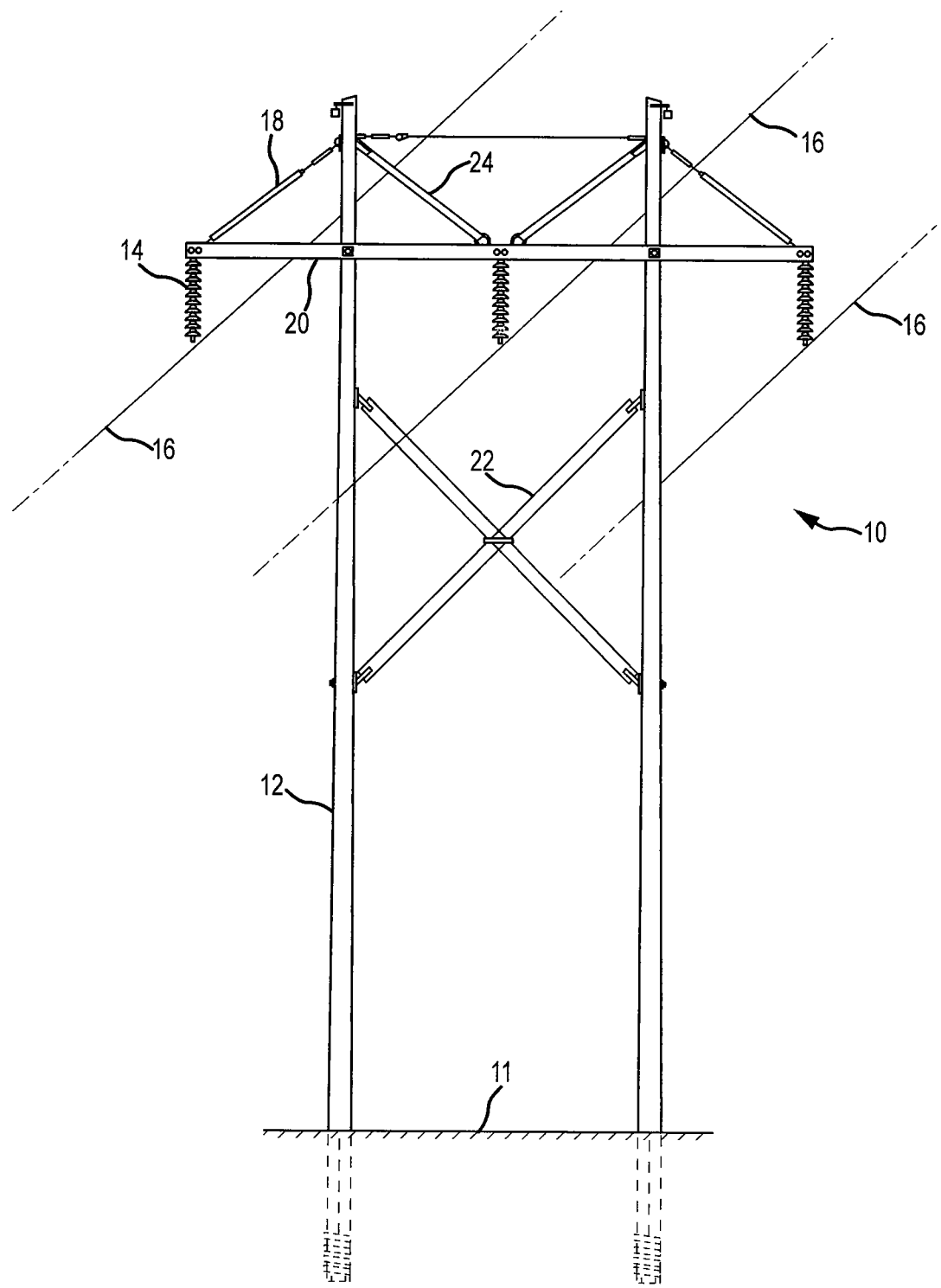
FIG. 1 is a front elevation view of a H-frame transmission support structure supporting three transmission lines.

In some embodiments, a spacer fitting repair and reinforcement plate is disclosed. The spacer fitting repair plate can be installed on a transmission line support structure to quickly and simply repair worn out connection points. For example, in some embodiments, the spacer fitting repair plate may be installed on a spacer fitting assembly for a H-frame support structure. The spacer fitting repair plate may be installed on the H-frame by attaching the repair plate to an aperture within the original spacer fitting. The aperture or connection point for the original spacer fitting may have been used to support insulators for transmission lines. The aperture where the insulators connected to the spacer fitting may be worn out and so the spacer fitting repair plate may use friction along the face of the original spacer fitting, as well as a bolt, to secure to the original spacer fitting assembly. For instance, the repair plate may act as a clamp and be configured to create a frictional contact between the surfaces of the spacer fitting and of the repair plate. The frictional contact between the spacer fitting and the repair plate may be substantial enough that the repair plate can be adequately supported off of the spacer fitting without substantial, if any, reliance on the original aperture of the spacer fitting assembly, which may be substantially worn and otherwise incapable of supporting the combined weight of the repair plate and insulators and transmission lines. In such embodiments, the frictional contact may provide a substantial portion, if not all, of the support needed to allow the repair plate to be supported from the spacer fitting and also support the insulators and transmission lines. When connected to the original spacer fitting assembly, the repair plates create a new connection area or aperture for the insulators and/or transmission lines to connect to the transmission support structure. The repair plate replaces the aperture used by the insulators, without requiring the original spacer fitting assembly to be removed from the support structure.

In other embodiments, a method for installing a reinforcement plate for a spacer fitting assembly is disclosed. In these embodiments, any insulators or transmission lines may be removed from the spacer fitting. The area surrounding an aperture where the insulators had been connected is ground or filed, substantially eliminating ridges that may have been formed around the aperture due to mushrooming. Once the spacer fitting assembly has been filed, the repair plate, including a front plate and a back plate, is fitted around a front side and back side of the spacer fitting assembly. The front plate and back plate may be positioned to align a connection aperture located on both the front and back plates with the aperture the spacer fitting used to support the insulators. Then the front plate, back plate and original spacer fitting may be fastened together, by inserting a fastener through a passageway created by aligning the connection apertures of the front and back plates with the aperture on the spacer fitting assembly that had been supporting the insulators. The fastener is tightened to cause the repair plate to frictionally interact with the ground spacer fitting assembly to form a combined or integral assembly capable of supporting an insulator and the wire supported by the insulator. Once the fastener is tightened such that the repair plate has frictionally engaged the spacer fitting in a snug fashion, the fastener may be further tightened approximately ¼ to approximately ¾ turn. In one embodiment, the further tightening of the fastener may be approximately ⅓ of a turn.

One skilled in the art will understand that the following description has broad application. For example, while embodiments disclosed herein can focus on a spacer fitting repair support structure, it should be appreciated that the concepts disclosed herein equally apply to original spacer fitting assemblies, including adjustable and/or non-adjustable spacer fitting assemblies. Furthermore, while embodiments disclosed herein can focus on H-frame cross beam spacer fitting assemblies, other types of spacer fittings could be repaired with techniques and support structures disclosed herein. Also, for the sake of discussion, the embodiments disclosed herein can tend to focus on spacer fittings used in transmission line support structures; however, these concepts apply to areas outside of the transmission line context, i.e. to general construction techniques and/or bracket connectors. Accordingly, the discussion of any embodiment is meant only to be exemplary and is not intended to suggest that the scope of the disclosure, including the claims, is limited to these embodiments.

FIG. 1 is a front elevation view of a H-frame transmission support structure 10 supporting transmission lines 16. The H-frame support structure 10 may support three transmission lines 16, for example each transmission line 16 may be a single phase conductor for electricity. The transmission lines 16 in other embodiments may be telephone wires, cable wire, fiber optic cable and the like. In some embodiments, for example if the transmission lines 16 are electrical conductors, the transmission lines 16 may be connected to the H-frame support structure via insulators 14. The insulators 14 protect the electrical current from traveling from the transmission lines 16 to the H-frame support structure 10. The insulators 14 may be attached to the H-frame support structure 10 by a hook, clevis, or the like extending from a spacer fitting assembly. The spacer fitting assembly, in these embodiments may be connected to the horizontal cross beams 20 of the H-frame support structure at a connection between the horizontal cross beams 20.

Figures 2A, 2B:
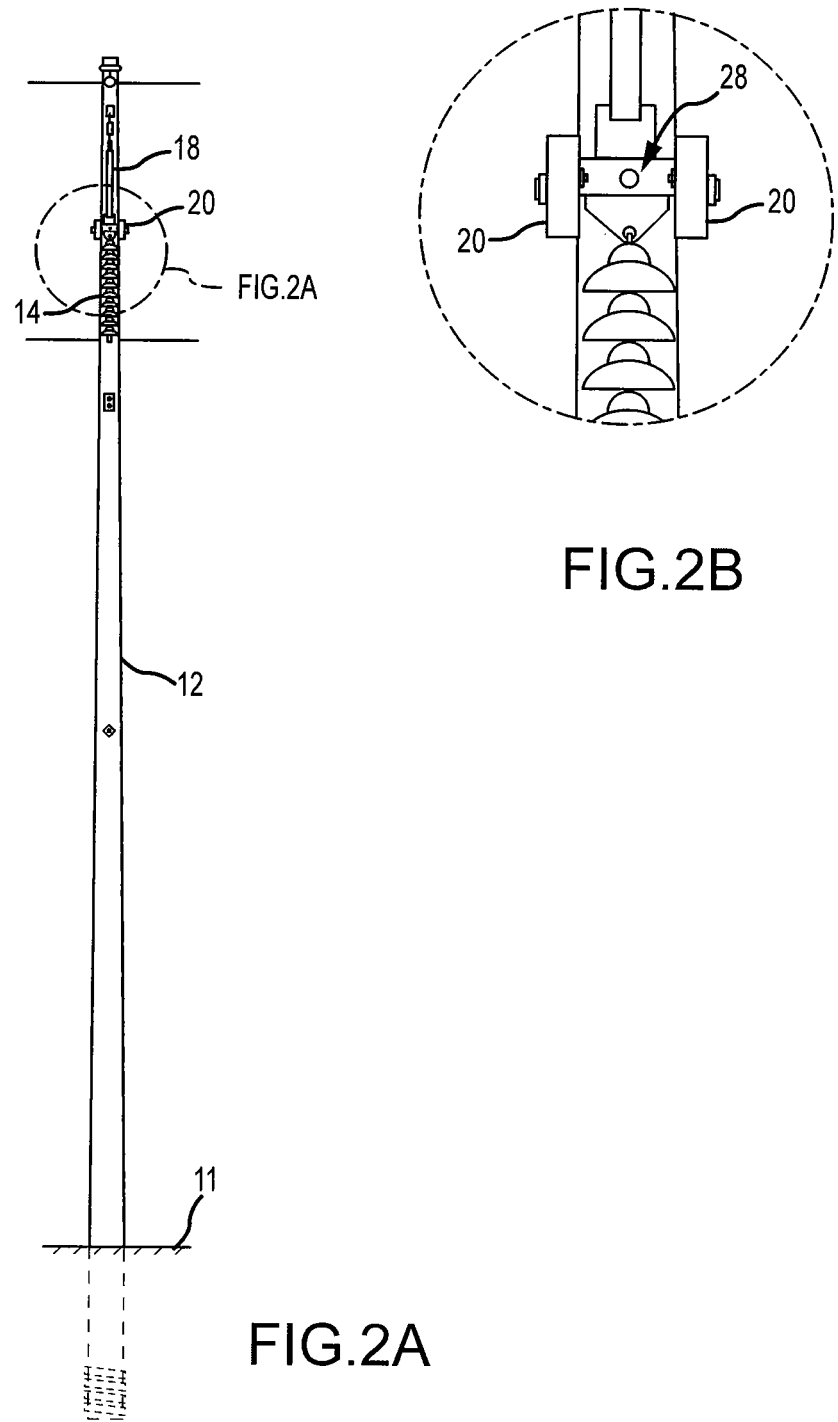
FIG. 2A is a side elevation view of the H-frame illustrated in FIG. 1.
FIG. 2B is an enlarged view of the insulators connected to the H-frame structure illustrated in FIG. 2A.
Figure 3A:
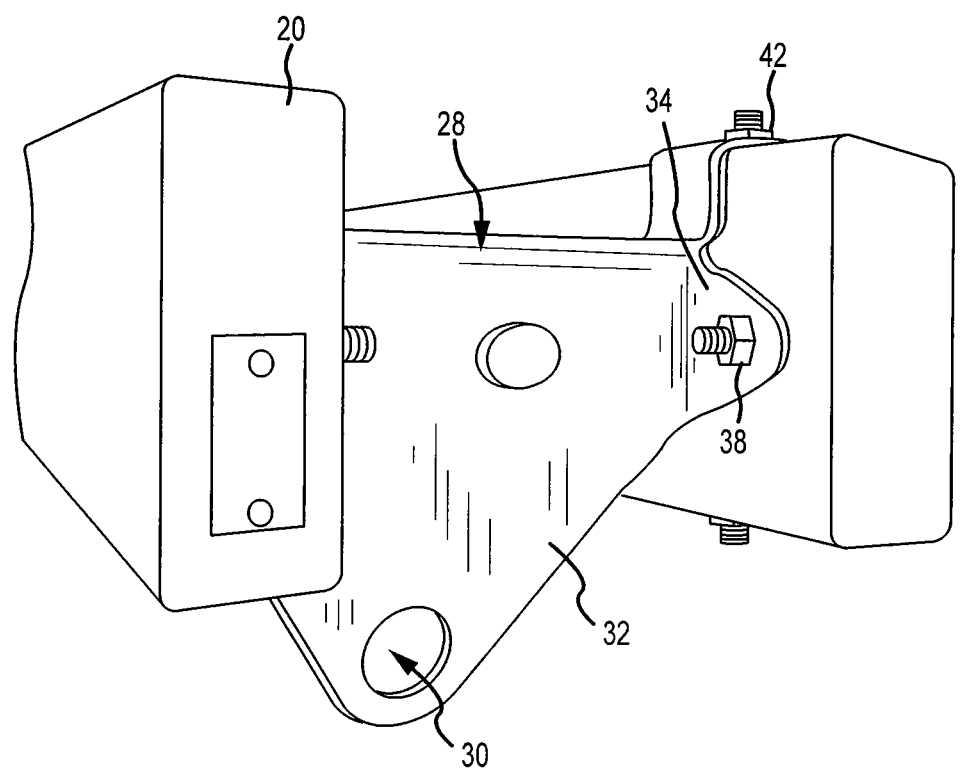
FIG. 3A is an elevation view of a non-adjustable or unitary spacer fitting assembly installed between two cross beams of the H-frame illustrated in FIG. 1.
Figure 3B:
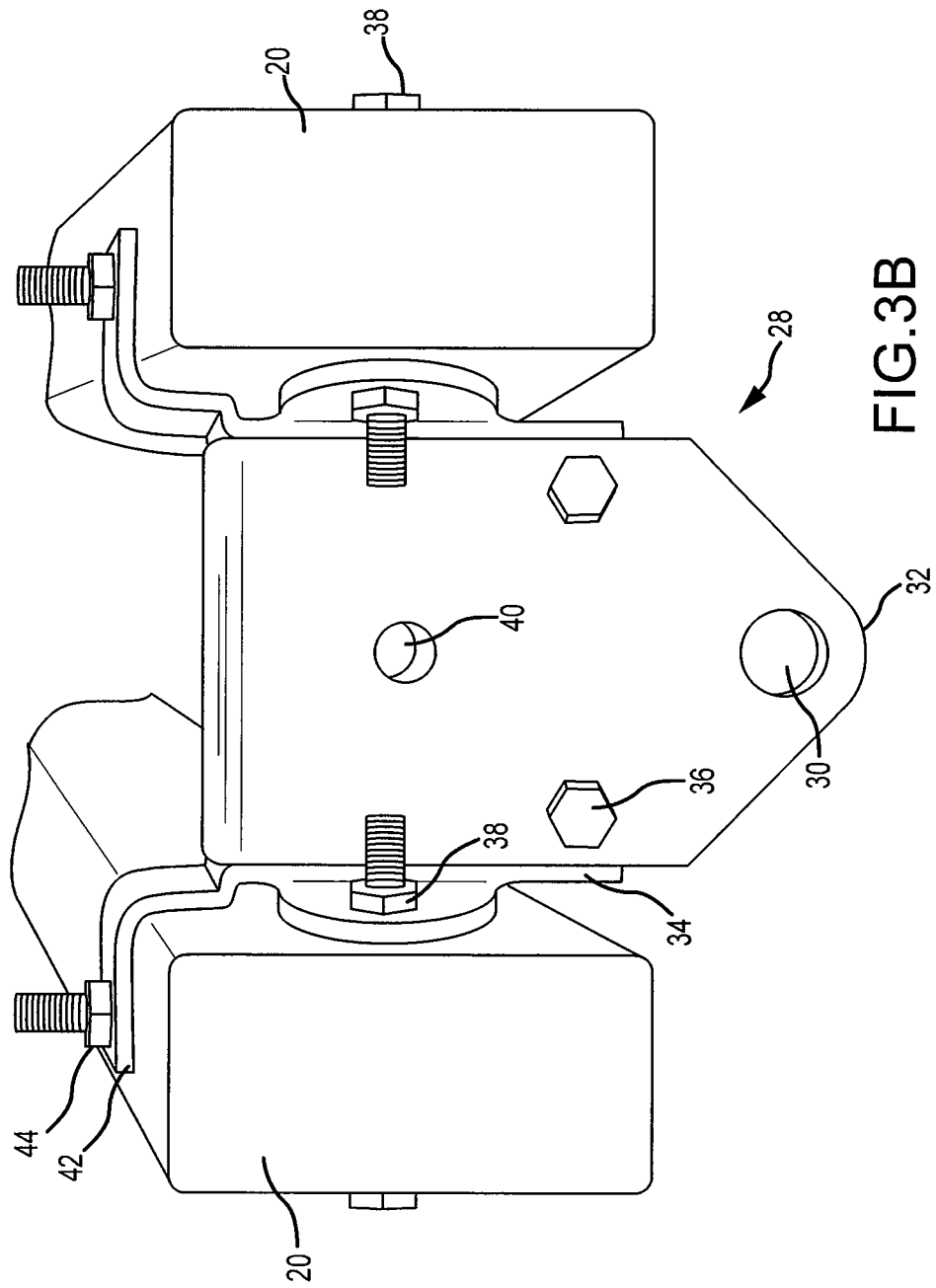
FIG. 3B is an elevation view of an adjustable or non-unitary spacer fitting assembly installed between two cross beams of the H-frame illustrated in FIG. 1.

FIG. 2A illustrates a side view of the H-frame support structure illustrated in FIG. 1, FIG. 2B illustrates an enlarged view of the insulators connected to the H-frame; FIG. 3A is a elevation view of a non-adjustable spacer fitting assembly between two cross beams of the H-frame support structure, and FIG. 3B is an elevation view of an adjustable spacer fitting assembly between two cross beams of the H-frame support structure. Referring now to FIGS. 1-3B, the H-frame support structure 10 supports the transmission lines 16 above the ground 11. The H-frame support structure 10 is supported by vertical columns or poles 12 that can be directly imbedded or otherwise anchored into the ground 11. The vertical poles 12 may be braced or supported by cross beams 22. The cross beams 22 may connect to each vertical pole 12 to provide structural support and the two cross beams 22 may cross each other while spanning between the two vertical poles 12. The H-frame support structure 10 may also include horizontal cross beams 20 located near the top end of the vertical poles 12. The horizontal cross beams 20 may be spaced apart from each other via a spacer fitting assembly 28. The horizontal cross beams 20 may additionally be attached to top knee braces 24. The knee braces 24 may span from the vertical post 12 to the horizontal cross beams 20 and provide additional structural support to the H-frame support structure 10. Additionally, the horizontal cross beams 20 may attach to strain braces 18. The strain braces 18 may extend from an outside end of the horizontal cross beams 20 to the vertical poles 12. The strain braces 18 may be connected to the vertical poles 12 and each vertical pole 12 is in turn connected to each other via a wire or other connector that extends between the vertical poles 12.

The horizontal cross beams 20 may support the transmission lines 16 via the insulators 14, which are supported from the horizontal cross beams 20 via the spacer fitting assembly 28. The transmission lines 16 may be spaced along the horizontal cross beams 20 intermittently. In some embodiments the transmission lines 16 are located at each end of the horizontal cross beams 20, as well as in the middle of the horizontal cross beams 20.

Referring now to FIGS. 2A-3B, the insulators 14 may be attached to the horizontal cross beams 20 via the spacer fitting assembly 28. The spacer fitting assembly 28 spans between the horizontal cross beams 20 and is secured to each horizontal cross beam 20. In some embodiments, as shown in FIG. 3B, the spacer fitting assembly 28 may be adjustable, such that the spacer fitting assembly 28 can adjust to fit multiple different distances between each horizontal cross beam 20. For example, the horizontal cross beams 20 in some embodiments may be made of wood and have different cross sectional areas, widths, or the like, and the adjustable nature of the spacer fitting assembly 28 may be used to simply install between both ends and a middle portion of the horizontal cross beams 20. The spacer fitting assembly 28 in other embodiments may be non-adjustable, as shown in FIG. 3A, and attach to the horizontal cross beams 20 at the same distance on each end.

The spacer fitting assembly 28 may include a bracket 34 which attaches to each horizontal cross beam 20 via at least one fastener 38, 44. In some instances, there may be a top fastener 44 which connects the bracket 34 to the top portion of the horizontal cross beam 20. The top fastener 44 may connect to the bracket 34 by a top fitting plate arm 42, that bends to run along the border of the horizontal cross beam 20 to the top portion. The bracket 34 may also connect to a side surface of the horizontal cross beams 20 by a side fastener 38.

The spacer fitting assembly 28 may include a spacer fitting 32, which provides an insulator aperture 30 for receiving a connector (e.g., hook, clevis or other device) for connecting the insulators 14 (or transmission lines 16) to the H-frame support structure 10. In implementations utilizing a non-adjustable spacer fitting (e.g., FIG. 3A), the bracket 34 and the spacer fitting 32 may be a unitary assembly. In implementations utilizing a non-adjustable spacer bracket 28 (e.g., FIG. 3B), the bracket 34 may be a separate structure from the spacer fitting 32. In these embodiments, the bracket 34 extends through an opening within the spacer fitting 32, such that the spacer fitting 32 essentially wraps around the bracket 34. The bracket 34 may then be secured in place within the spacer fitting 32 by fitting fasteners 36. The fitting fasteners 36 also secure the spacer fitting assembly 28 at a set distance between the horizontal cross beams 20, preventing the horizontal cross beams 20 from substantially moving in the lateral or vertical directions away or towards each other. The spacer fitting 34 also may include a top aperture 40, which may be used to secure the strain braces 18 to the cross beams 18.

As discussed above, in some embodiments, the bracket 34 and the spacer fitting 32 may be multiple pieces bolted or otherwise joined together to form the spacer fitting assembly 28, see e.g., FIG. 3B. In other embodiments, the bracket 34 and the spacer fitting 32 may be a single unitary structure cast, forged, or otherwise formed and forming the spacer fitting assembly 28, see, e.g., FIG. 3A. It should be noted that in embodiments discussed herein, the repair plate may be operably connected to either type of spacer fitting assembly 28.

Figure 11:
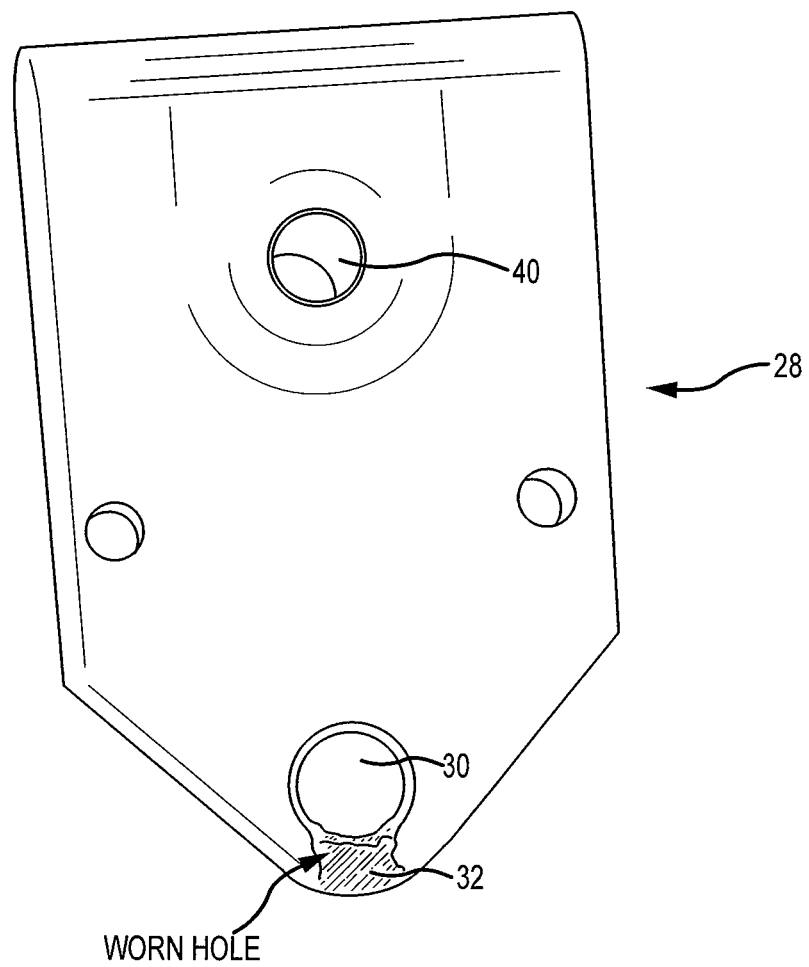
FIG. 11 is an elevation view of a spacer fitting with a worn aperture.

The insulator aperture 30 via a hook, clevis, etc. extended there through, connects the insulators 14 to the H-frame 10 support structure. Over time, as shown in FIG. 11, the insulator aperture 30 may become worn and elongated, due to the movement and load of the insulators 14 and the transmission lines 16. Also, the material, (e.g., steel or other metals), of the spacer fitting assembly 28 may migrate from the inner diameter of the insulator connection aperture 30 to the front of the spacer fitting 32, causing the insulator aperture 30 to be additionally weakened. Once the insulator aperture 30 becomes elongated or otherwise weakened, it may fail and cause the insulators 14 and the transmission lines 16 to fall to the ground 11.

FIGS. 4-8 illustrate different views of a spacer fitting repair and reinforcement plate 50 to be used with the spacer fitting assembly 28 illustrated in FIGS. 3A and 3B. The spacer fitting repair plate 50 or reinforcement plate may be attached to the H-frame 10 support structure and may be connected to the insulators 14 and the transmission lines 16. The repair plate 50 may be connected to the spacer fitting assembly 28 and be used to support the load of the insulators 14 and the transmission lines 16. The repair plate 50 may be installed over the original spacer fitting assembly 28, allowing the insulator aperture 30 to essentially be replaced without installing a new spacer fitting assembly 28. In some embodiments, the repair plate 50 may be integrally formed of a single piece of material or welded (or otherwise assembled from multiple pieces) to form an integral piece. However, in other embodiments, the repair plate 50 may include a front plate 56 and back plate 58, which may be two separate pieces that may then be fastened together around the spacer fitting assembly 28.

The repair plate 50 includes a receiving aperture 54 located towards a bottom portion of the repair plate 50. The receiving aperture 54 may be configured similarly to the insulator aperture 30 in the spacer fitting assembly 28, and may receive a hook or other connector to secure the insulators 14 or transmission lines 16 to the H-frame support structure 10.

Figure 4:
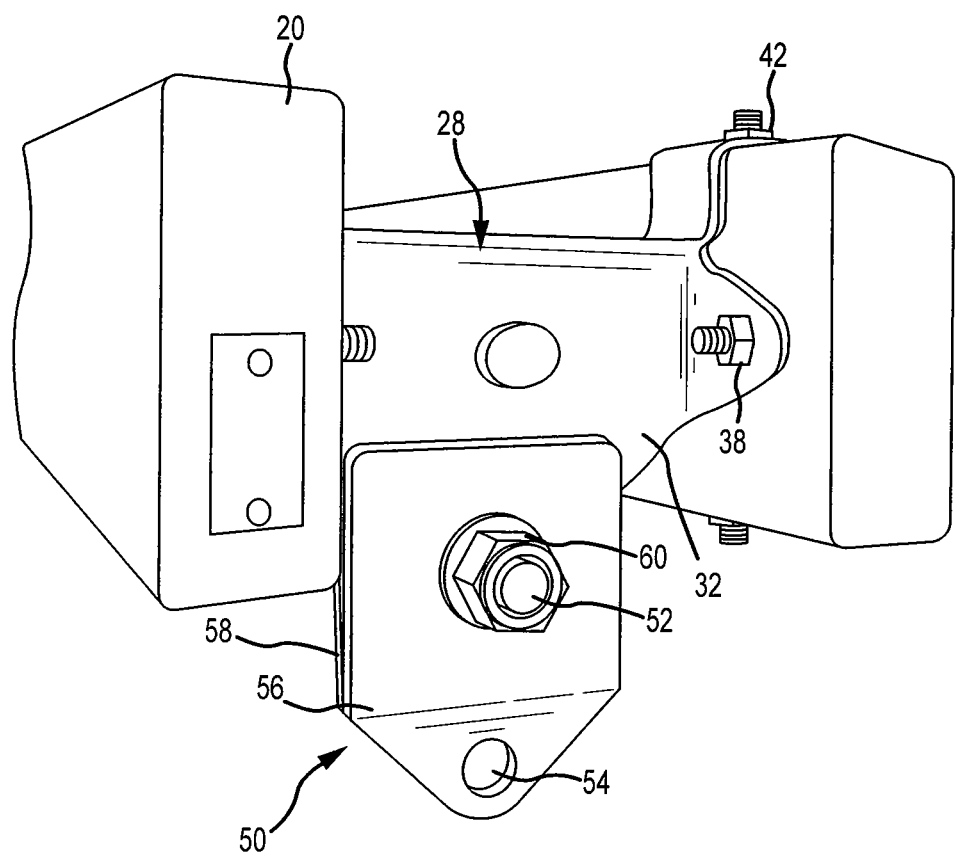
FIG. 4 is a side perspective view of a repair plate installed on the spacer fitting assembly illustrated in FIG. 3A.
Figure 9:
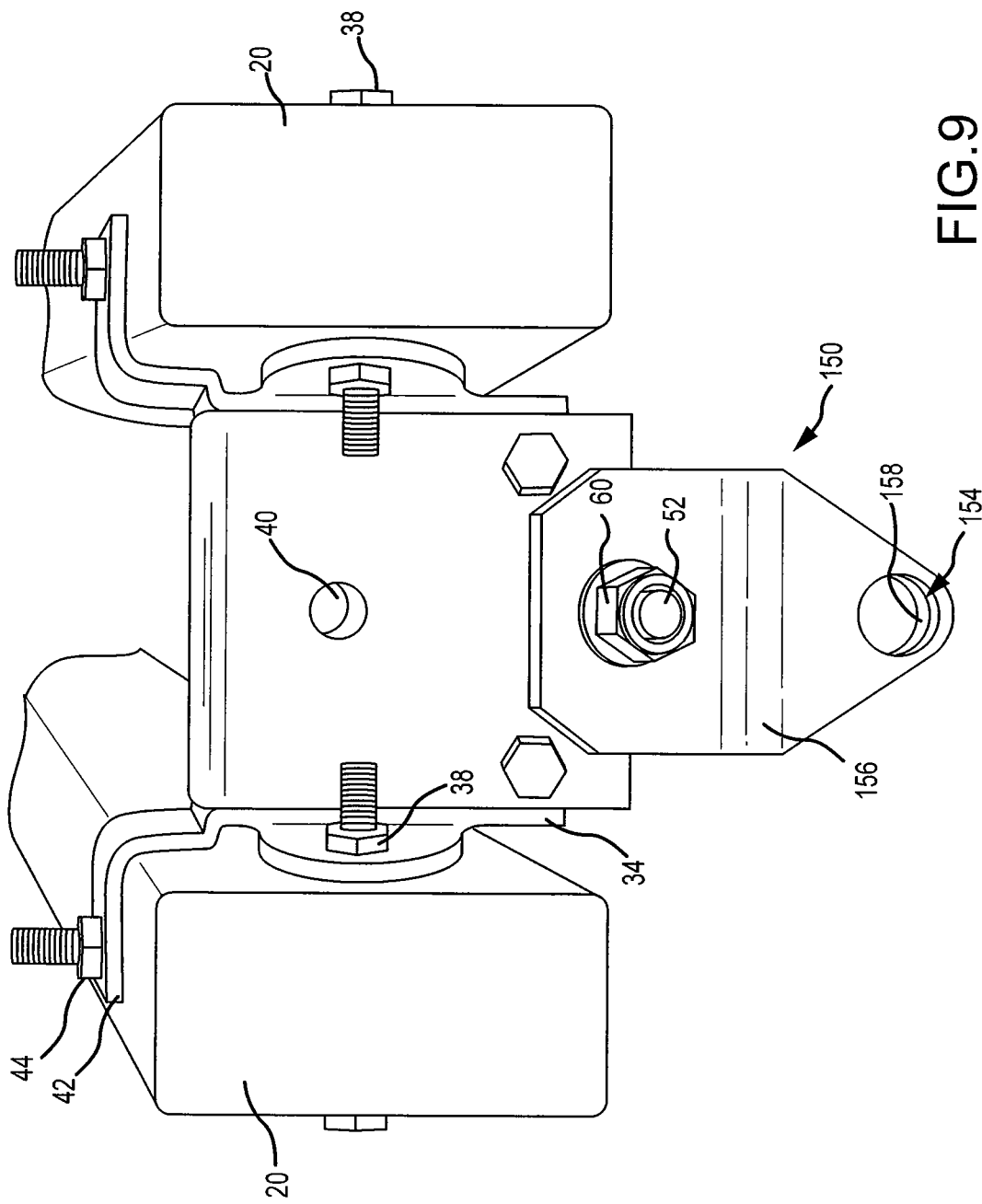
FIG. 9 is a side perspective view of another embodiment of the repair plate installed on the adjustable spacer fitting assembly illustrated in FIG. 3B.

In some embodiments, the repair plate 50 is connected to the spacer fitting assembly 28 via the insulator aperture 30. As illustrated in FIG. 7, the repair plate 50 includes a connector aperture 62 which may be configured to receive a connecting fastener 52. The connector aperture 62 may be configured to be substantially the same diameter as the insulator connector aperture 30. For example, in some embodiments the connector aperture 62 may be approximately 1.43 inches in diameter. These embodiments allow a fastener (e.g., connecting fastener 52) to securely extend through the connector aperture 62, as well as the insulator connector aperture 30. Referring now to FIG. 4, the connecting fastener 52 secures the repair plate 50 to the original spacer fitting assembly 28. The spacer fitting assembly 28 may be single unitary structure 28 (as shown in FIGS. 3A and 4) or a multi-piece structure 28 (as shown in FIGS. 3B and 9).

The repair plate 50 may include a front plate 56 and a back plate 58, the front plate 56 and back plate 58 may wrap or surround around a bottom portion the spacer fitting 32. In some embodiments, the front plate 56 is located on the front or outwards facing side of the spacer fitting 32, while the back plate 58 may be located on the back or inwards (towards the center of the H-frame support structure 10) facing side of the spacer fitting 32. However, in other embodiments, the repair plate 50 may be configured in other arrangements around the spacer fitting assembly 28. Additionally, the front plate and the back plate may be substantially similar to one another. The repair plate 50 may be configured to be located beneath any fastener apertures located on the spacer fitting assembly 28. For example, the repair plate 50 may be installed underneath the top aperture 40 (see FIG. 4), such that the strain braces 18 may not be effected by the installation of the repair plate 50.

Figure 5:
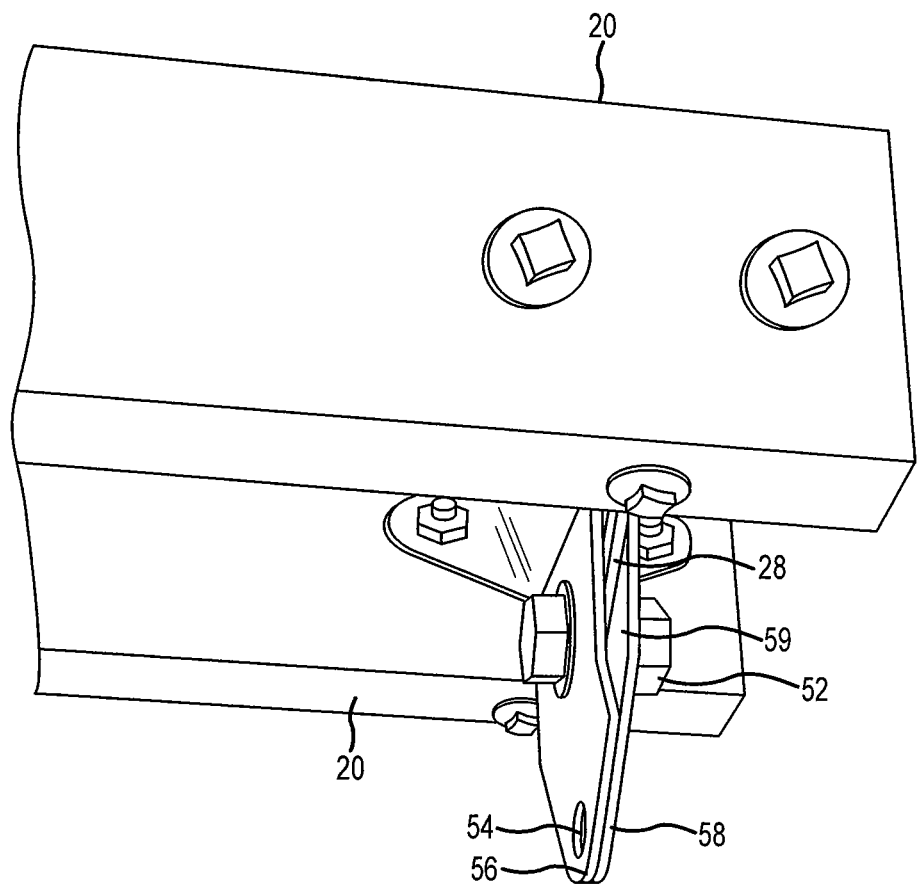
FIG. 5 is a bottom perspective view of the repair plate illustrated in FIG. 4.
Figure 6:
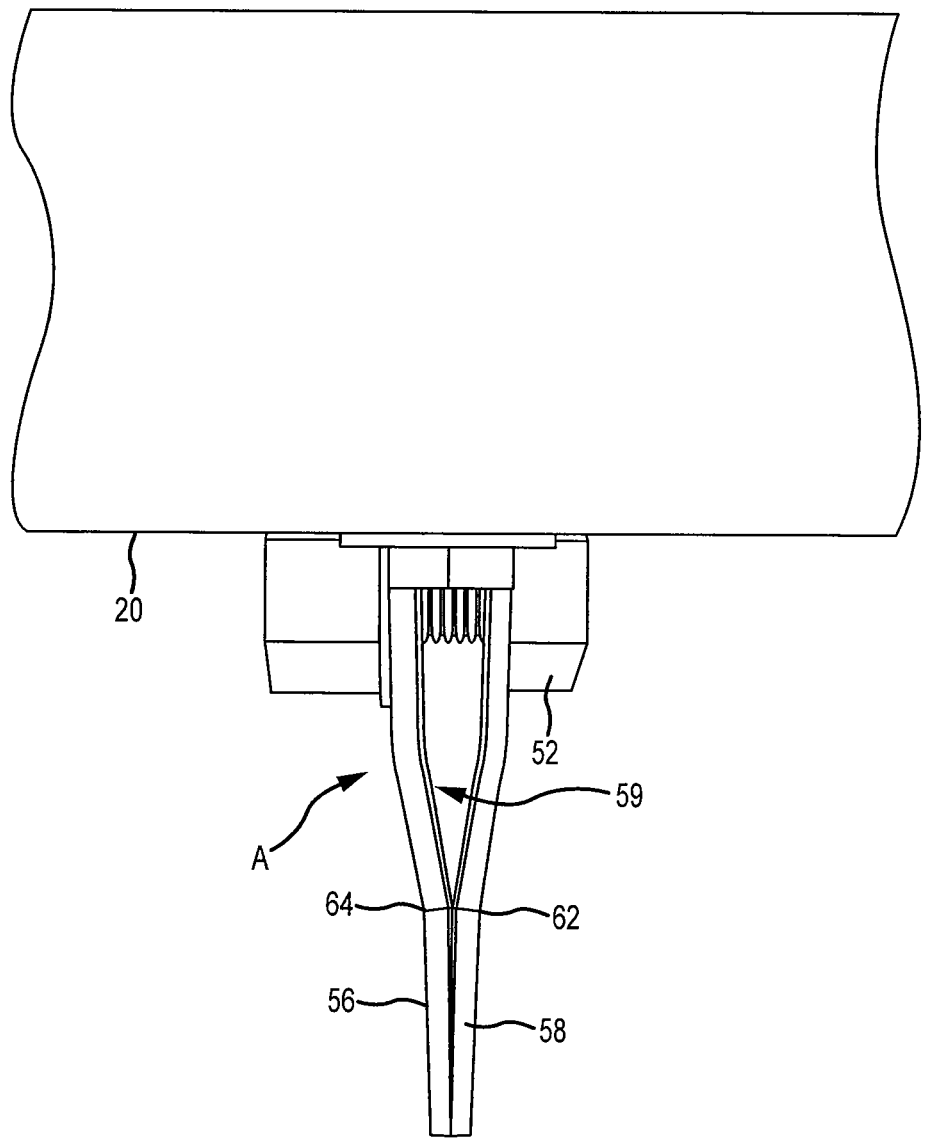
FIG. 6 is an edge view of the repair plate as illustrated in FIGS. 4 and 5.
Figure 7A:
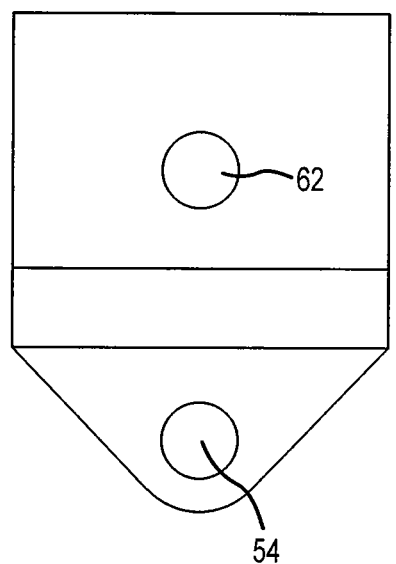
FIG. 7A is an elevation view of the first plate of the repair plate illustrated in FIG. 4.
Figure 7B:
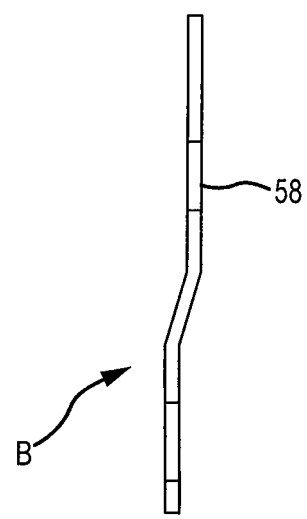
FIG. 7B is an edge view of the first plate illustrated in FIG. 7A.
Figure 8:
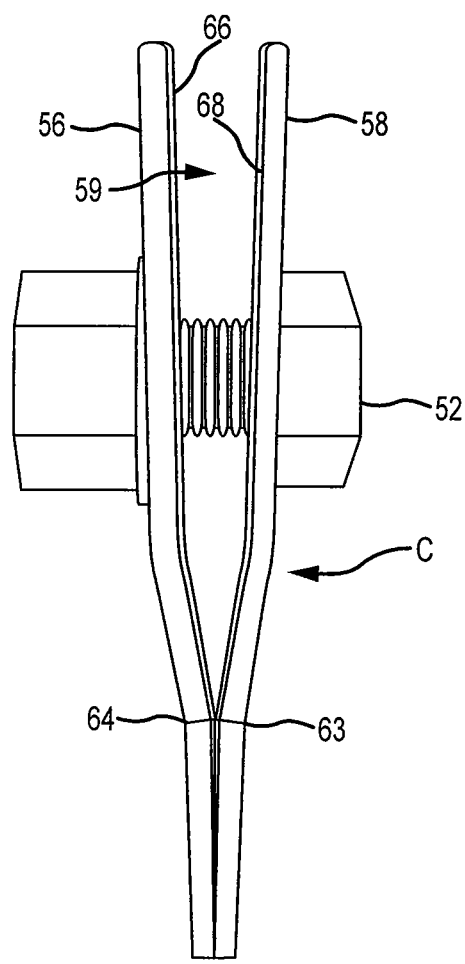
FIG. 8 is an edge view of the first and a second plate of the repair plate connected via a fastener.

Referring now to FIGS. 6-8, the repair plate 50 in some embodiments may be shaped such that the front plate 56 and the back plate 58 include a slight curvature, as shown at arrows A, B and C in FIGS. 6, 7, and 8, respectively. In these embodiments, the front plate 56 and the back plate 58 may be spaced sufficiently far apart to receive the width of the spacer fitting 32, but then curve back to touch or essentially touch each other. In some embodiments the front plate 56 and/or back plate 58 may be curved such that there is a difference of approximately ¼ inch between a top portion of the plate and a bottom portion. It should additionally be noted that in some embodiments, the front plate 56 and the back plate 58 may include the same dimensions and shape, whereas in other embodiments, the front plate 56 and the back plate 58 may include different shapes and/or dimensions. In some embodiments, the front plate 56 and back plate 58 may curve towards each other at a bend point 63, 64. After the bend point 63, 64 the front plate 56 and back plate 58 may be adjacent to each other. The bend point 63, 64 may include an angled portion that is angled towards a back portion of the front and back plates 56, 58. The angled portion may be angled to be offset a distance of about ¼ inch back from the front of the front and back plates 56, 58. Thus, as can be understood from FIGS. 5, 6 and 7, when the plates 56, 58 are joined together, a gap 59 is defined between the plates 56, 58 that is configured for the spacer fitting 32 of the spacer fitting assembly 28 to be received therein.

Referring now to FIGS. 5 and 8, when the repair plate 50 is installed around the spacer fitting assembly 28, an inside portion 66, 68 of each the front and back plates 56, 58 may be in contact with the spacer fitting 32. In these embodiments, the inside portion 66, 68 of each plate includes a frictional contact with the spacer fitting 32. For example, in some embodiments, the front plate 56 and the back plate 58 may be constructed out of galvanized steel, COR-TEN, weathering steel or other similarly rough materials. In these embodiments, the material may be rough and create a frictional contact between the spacer fitting 32 and the front and back plates 56, 58, providing additional support for the weight of the insulators 14 and transmission lines 16. The frictional contact between the spacer fitting 32 and the plates 56, 58 allows the repair plate 50 to function as a clamp around the spacer fitting 32. This clamping function may allow the repair plate 50 to attach to the spacer fitting assembly 28 although the insulator aperture 30 may have actually failed. For example, the clamping nature of the repair plate 50 results in frictional contact sufficient to support the repair plate 50, as well as any attached insulators 14 and/or transmission lines, without the additional support of any fasteners connecting the repair plate 50 to the spacer fitting 32. In these embodiments, any fasteners (e.g., connecting fastener 52) connecting the repair plate 50 to the spacer fitting assembly 28 may provide little or no support for the weight of the repair plate 50 and/or insulators 14 and transmission lines. Instead, such fasteners 52 may simply provide the mechanism by which the plates 56, 58 of the repair plate 50 are brought into clamping engagement with the spacer fitting 32, the fasteners 52 not contributing significantly to the support of the repair plate 50 from the spacer fitting 32 in any other way As illustrated in FIG. 7B, in some embodiments, a bottom portion of each the front plate 56 and the back plate 58 may be slightly tapered in the direction of the connection aperture 54. In these embodiments, the insulators 14 (when connected to the repair plate 50) may swing in multiple directions without hitting the repair plate 50. For example, in some embodiments the bottom portion may be triangular shaped which may allow the any insulators 14 that may be connected to freely rotate around the front plate 56 and back plate 58. However, in other embodiments the bottom portion of the front and back plates 56, 58 may be shaped differently. For example, depending on the location of the H-frame support structure 10, the transmission lines 16 or the insulators 14 may not swing or be moved substantially, and so the bottom portion may not need to be tapered.

Figures 10A, 10B:
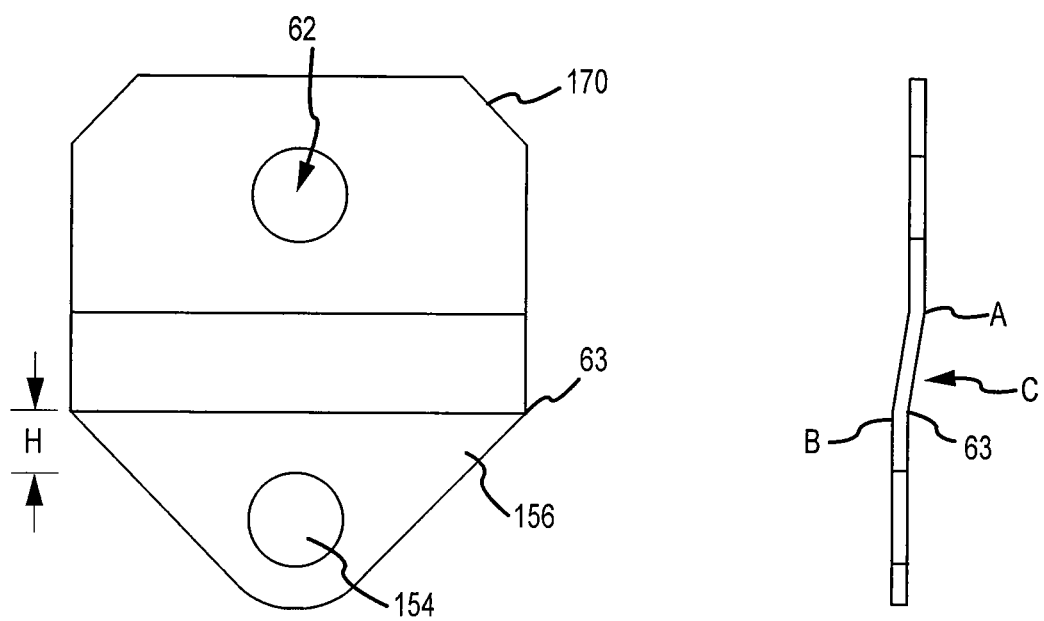
FIG. 10A is an elevation view of a first plate of the repair plate illustrated in FIG. 9.
FIG. 10B is an edge view of the first plate illustrated in FIG. 10A.

FIG. 9 is a side perspective view of another embodiment of the repair plate 150 installed on a spacer fitting assembly 28, FIG. 10A is a front elevation view of a first plate of the repair plate 150, and FIG. 10B is an edge view of the first plate of the repair plate 150. Although the back plate 158 of the repair plate is not illustrated in FIGS. 10A and 10B, the back plate 158 may be substantially similar to the first plate 156 illustrated in FIGS. 10A and 10B. The repair plate 150 may be substantially similar to the repair plate 50 illustrated in FIGS. 7A and 7B. However, in this embodiment, the repair plate 150 may include beveled or tapered upper edges 170. The beveled edges 170 may allow the repair plate 150 to better fit beneath the fitting fasteners 36 on the spacer fitting assembly 28. For example, in embodiments utilizing an adjustable spacer fitting assembly 28 (see e.g., FIG. 3A), this embodiment of the repair plate 150 may more easily be inserted onto the spacer fitting assembly 28. This is because the beveled edges 170 allow the repair plate 150 to be inserted onto the spacer fitting assembly 28 underneath the fitting fasteners 36, and thus the repair plate 150 may fit more variations of spacer fitting assemblies.

Additionally, in this embodiment, the repair plate 150 may include a shorter distance between curve point B and a receiving aperture 154. For example, in one embodiment of the repair plate 50 illustrated in FIG. 7A, the distance H between the curve point B and the receiving aperture 54 may range from approximately 1.5 to 2 inches. On the other hand, in the embodiment of the repair plate 150 illustrated in FIG. 10A, the distance H between the curve point B and the receiving aperture 154 may be approximately 1 inch. The shorter distance H may allow the repair plate 150 to fit more variations of spacer fitting assemblies 28. This is because the shorter distance between the receiving aperture 154 and the curve point B, as well as the beveled edges 170 allow the repair plate 150 to wrap around a small surface area of the spacer fitting assembly 28, and thus fitting multiple variations of spacer fitting assemblies 28. Also, the shorter distance may allow for less variation between hanging length of transmission lines 16 on H-frames 10 having the repair plates 50, 150 installed and those that do not have repair plates 50, 150. However, it should be noted that depending on the location of the insulation aperture 30, the overall dimensions of the spacer fitting assembly 28, and the like, the distance between the curve point B and the receiving apertures 54, 154 may vary.

In some embodiments, the repair plate 50, 150 may be installed on the original spacer fitting assembly 28 by first removing the insulators and/or any transmission lines 16 that may be attached. Once the insulators 14 and/or transmission lines 16 have been removed, the spacer fitting assembly 28 may be ground or otherwise filed down. This may be necessary because as the insulator aperture 30 over time may mushroom, pieces of material within the inner diameter of the insulator aperture 30 may migrate as it is pushed by the insulators 14 to the outer portion of the spacer fitting 32, causing a ridge around the insulator aperture 30. However, in other embodiments, the spacer fitting 32 may not need to be filed down, for example if no mushrooming has occurred within the insulator aperture 30. Once the spacer fitting 32 has been filed down to remove any ridges or excess material, the front and back plates 56, 58, 156, 158 may be installed around the spacer fitting 32. In these embodiments, the front plate 56, 156 may cover a portion of the spacer fitting 32 facing outwards and the back plate 58, 158 may cover another portion of the spacer fitting 32 facing inwards (towards the center of the H-frame support structure 10). In embodiments utilizing the repair plate 150 illustrated in FIGS. 9A and 9B, the beveled edges 170 may be positioned so that they are substantially underneath the fitting fasteners 36, and the connection aperture 62 is aligned with the insulator aperture 30. In other embodiments, the repair plate 50, 150 may only need to be positioned so that the insulator aperture 30 and the connection aperture 62 may be aligned.

After the front and back plates 56, 156, 58, 158 are aligned with the connection aperture 62, the connecting fastener 52 may be placed within the connection aperture 62 on each the front and back plates 56, 58, 156, 158. The connecting fastener 52 may fit through the connection aperture 62 on the front plate 56, 156, then fit through the insulator aperture 30 on the original spacer fitting assembly 28 and then extend outwards through the connection aperture 62 on the back plate 58, 158. In some embodiments, a washer 60 may be placed between the connection fastener 52 and the front and back plates 56, 58, 156, 158.

In these embodiments, the insulator aperture 30 may be used to secure the repair plate 50, 150 to the spacer fitting assembly 28. In some instances, the insulator aperture 30 may be elongated, worn-out or otherwise misshapen. In these instances, the material for the front and back plates 56, 58, 156, 158 may contain a frictional contact. In these embodiments, the friction between the front and back plates 56, 58, 156, 158 and the spacer fitting 32 helps to secure the repair plate 50, 150 to the spacer fitting 28, by providing additional structural support. This additional support allows the insulator aperture 30, which may be worn and near the point of failure, to better be able to support the weight of the repair plate 50, 150 and any attached insulators 14 and/or transmission lines 16. Thus, in some embodiments, the plates 56, 58, 156, 158 may be said to create a clamping frictional engagement with the spacer fitting 32 of the spacer fitting assembly 28, attaching the plates 56, 58, 156, 158 to the spacer fitting 32 and, in some instances, reinforcing the spacer fitting 32.

Once the connection fastener 52 is installed through the connection apertures 62 (and any washers 60 that may be used are also installed), the connection fastener 62 may be tightened. In some embodiments, the connection fastener 62 may be tightened very tight, to substantially prevent the repair plate 50, 150 from moving. After the connection fastener 52 is "snug tight" or substantially immovable within the connection apertures 62, the connection fastener 52 in some embodiments may be tightened one third of a turn tighter. These embodiments may increase the frictional contact between the plates 56, 58, 156, 158 and the spacer fitting 32. Next, the insulators 14 and/or transmission lines 16 may be hung from the receiving aperture 54. In these embodiments, the insulators 14 and/or transmission lines 16 may hang at a slightly lower height than they had hung from the insulator aperture 30 in the original spacer fitting assembly 28.

As discussed above, in some embodiments, the repair plate 50, 150 may not require any original fasteners or fasteners holding the spacer fitting 28 to the horizontal cross beams 20 to be removed. Additionally, the horizontal cross beams 20 may not have to be repositioned apart from each other, as the spacer fitting 28 may not have to be removed in order to add the repair plate 50, 150. These embodiments may decrease the costs and time associated with replacing worn-out insulator apertures 30.

What is claimed is:

1. A reinforcement assembly for a spacer fitting for a utility pole comprising:
   a front plate comprising
      a front connection aperture located at a top portion of the front plate, wherein the front connection aperture is configured to be substantially the same diameter as an insulator aperture on the spacer fitting; and
      a front receiving aperture located at a bottom portion of the front plate; and
   a back plate comprising
      a back connection aperture located at a top portion of the back plate, wherein the back connection aperture is configured to be substantially the same diameter as the insulator aperture on the spacer fitting; and
      a back receiving aperture located at a bottom portion of the back plate;
   wherein
   the back plate and the front plate are configured to be installed on opposite sides of the spacer fitting; and
   a portion of the back plate and a portion of the front plate extend below a terminal end of the spacer fitting to define a gap, wherein the gap continuously tapers from the terminal end of the spacer fitting until the portion of the back plate and the portion of the front plate abut one another.

2. The reinforcement assembly of claim 1, wherein
   the top portion of the front plate is offset at an offset distance from the bottom portion of the front plate; and
   the top portion of the back plate is offset at an offset distance from the bottom portion of the back plate.

3. The reinforcement assembly of claim 2, wherein the offset distance is approximately ¼ inch.

4. The reinforcement assembly of claim 1, wherein the front plate and the back plate are galvanized steel.

5. The reinforcement assembly of claim 1, wherein the bottom portion of the front plate is tapered in the direction of the front receiving aperture and the bottom portion of the back plate is tapered in the direction of the back receiving aperture.

6. The reinforcement assembly of claim 1, wherein the front plate and the back plate are configured to clamp around the spacer fitting and frictionally engage a portion of the spacer fitting.

7. The reinforcement assembly of claim 1, wherein the front plate and the back plate are configured to be substantially the same shape and size.

8. A clamp assembly for a spacer fitting comprising:
   a front plate comprising a first aperture and a second aperture;
   a back plate comprising a third aperture having substantially the same diameter as the first aperture and a fourth aperture having substantially the same diameter as the second aperture;
   a fastener configured to have substantially the same diameter as the first aperture and the third aperture, wherein the fastener is configured to be inserted into the first aperture and the third aperture; and
   at least one washer, wherein the at least one washer is configured to be disposed between the fastener and the front plate and the back plate; wherein
   the back plate and the front plate are configured to be installed on opposite sides of the spacer fitting; and
   a portion of the back plate and a portion of the front plate extend below a terminal end of the spacer fitting to define a cap, wherein the cap decreases in width from the terminal end of the spacing fitting until the portion of the back plate and the portion of the front plate touch each other.

9. The clamp assembly of claim 8, wherein the front plate and the back plate are galvanized steel.

10. The clamp assembly of claim 8, wherein the fastener is a bolt.

11. The clamp assembly of claim 8, wherein
the front plate is configured to provide a frictional contact between a first face of the front plate and a front face of the spacer fitting; and
the back plate is configured to provide a frictional contact between a second face of the back plate and a back face of the spacer fitting.

12. The clamp assembly of claim 8, wherein the front plate and the back plate are configured to frictionally engage to the spacer fitting.

13. The clamp assembly of claim 8, wherein
the front plate has a first top portion and a first bottom portion, the first top portion has two beveled edges forming two corners of the first top portion, and the first bottom portion is substantially triangular shaped; and
the back plate has a second top portion and a second bottom portion, the second top portion has two beveled edges forming two corners of the bottom top portion and the second bottom portion is substantially triangular shaped.

14. The clamp assembly of claim 13, wherein
the first aperture is located in the first top portion;
the second aperture is located in the first bottom portion;
the third aperture is located in the second top portion;
the fourth aperture is located in the second bottom portion; and
wherein the second aperture and the fourth aperture are configured to receive an insulator strand.

15. The reinforcement assembly of claim 6, wherein the frictional engagement between the spacer fitting and the front plate and the back plate provides substantially all of the support to secure the front plate and the back plate to the spacer fitting.

* * * * *